June 20, 1939. A. H. HAPPE 2,163,036
ELECTRIC HEATER
Original Filed June 21, 1934
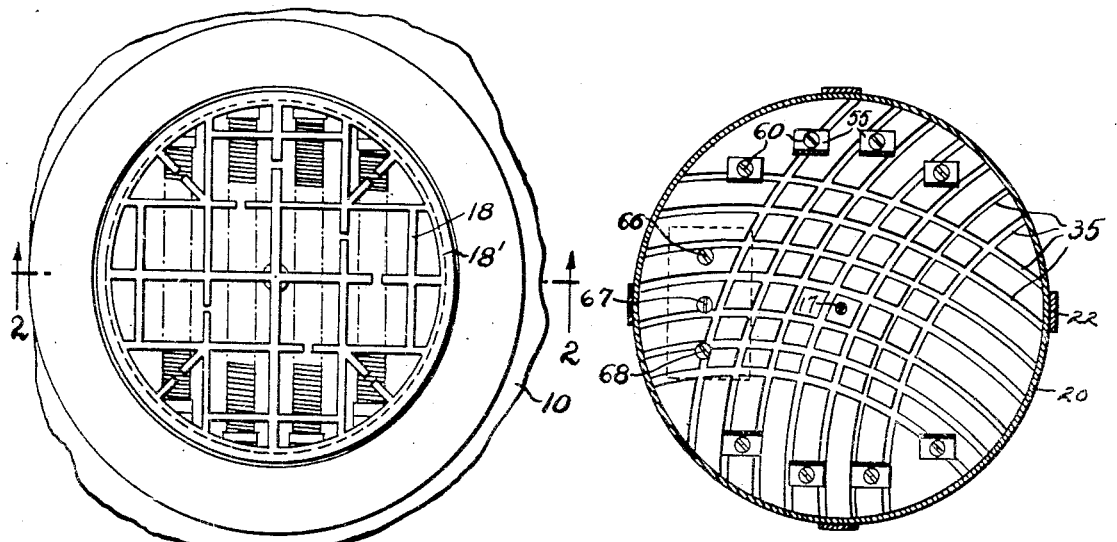
Fig. 1  Fig. 3
Fig. 2
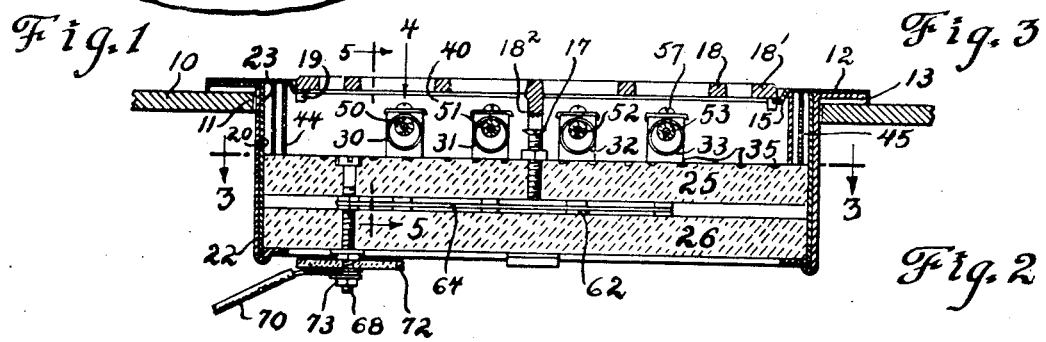
Fig. 4  Fig. 5  Fig. 6
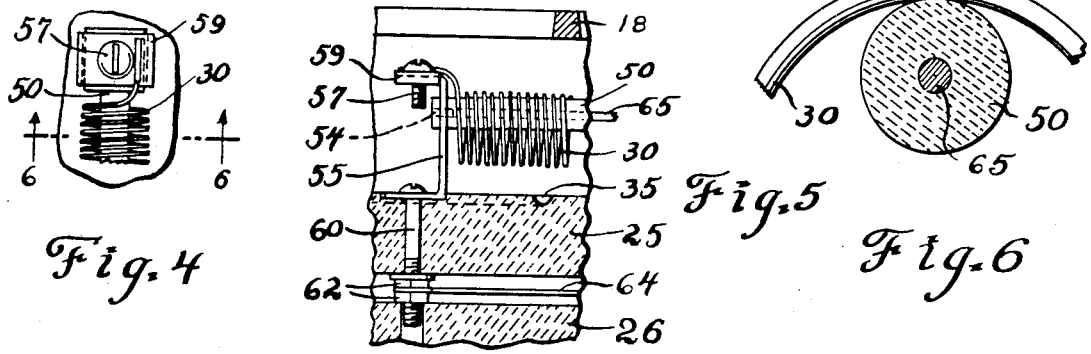
Fig. 7
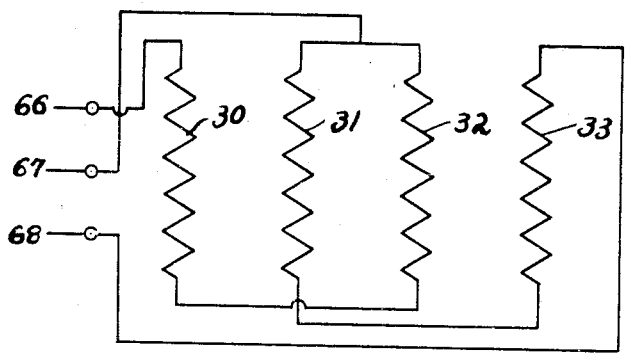
INVENTOR.
Arthur H. Happe
BY Swan, Trye & Hardesty
ATTORNEYS.

Patented June 20, 1939

2,163,036

UNITED STATES PATENT OFFICE 2,163,036

ELECTRIC HEATER

Arthur H. Happe, Detroit, Mich., assignor of one-half to Herman A. Sperlich, Detroit, Mich.

Application June 21, 1934, Serial No. 731,592
Renewed November 28, 1938

10 Claims. (Cl. 201—63)

This invention relates to electrical heating devices of the variety used in electric stoves, hotplates, and the like. An important object of the invention is the provision of an improved burner construction enabling the application of higher temperatures to cooking receptacles than has heretofore been feasibly attainable in electric stoves, and in which despite such increased temperatures safeguard is provided against the danger of burning out either the cooking vessel or the heating unit itself.

A further object of this invention is the provision of novel and greatly improved means for supporting an electrical heating element in such a burner.

Another object is the provision of a plate-type electrical heater especially suited for use as a stove burner and incorporating the benefits of both reflecting and purely plate-type heaters heretofore used, and in which a combined reflecting and hearth plate portion is provided arranged to increase by reflection the amount of radiant heat thrown against a cooking vessel or other object positioned above the heater, yet so located and constructed that it cannot interfere with quick attainment of maximum temperature by the unit.

A further object is the provision of means preventing the destruction of the combined reflecting and backing plate either by internal stresses arising from unequal heating of various parts thereof, or by fusing or melting, either under the direct action of the heating elements or such action augmented by the chemical effect of substances accidentally spilled upon the burner.

Another object is the provision of improved connecting means for electric heating elements providing not only an unusually large area of electrical contact, but assisting rapid heat dissipation from the terminals in a manner calculated to safeguard the latter against burning out.

Still another object is the provision of an improved supporting grille construction for holding desired articles in proper position over such a burner and so designed that expansion and contraction of the grille is controlled in a novel manner preventing injury and unwanted distortion of the parts, and in which a novel and cooperative structural arrangement between the grate and burner is provided for maintaining a predetermined geometrical relationship between such parts.

Still further my invention aims to provide improved means for preventing unwanted heat losses by conduction and radiation, and for simultaneously preventing injury to connecting parts and the like by misapplied heat.

The invention also contemplates the provision of a plate-type heater in which the heating elements are spaced from the plate in a novel manner.

Other objects and advantages will be apparent from the following description wherein reference is made to the accompanying drawing illustrating a preferred embodiment of my invention, and wherein similar reference numerals designate similar parts throughout the several views.

In the drawing:

Figure 1 is a plan view of a heater incorporating the principles of my invention, fragmentarily showing a supporting stove top.

Figure 2 is a diametrical cross section taken substantially on the line 2—2 of Figure 1, and looking in the direction of the arrows.

Figure 3 is a horizontal section partly in plan, taken substantially on the line 3—3 of Figure 2 and looking in the direction of the arrows.

Figure 4 is a fragmentary plan view of one of the terminal connecting portions of a heating element, taken as indicated by the arrow 4 of Figure 2.

Figure 5 is a fragmentary detailed section taken substantially on the line 5—5 of Figure 2 and looking in the direction of the arrows.

Figure 6 is a fragmentary detailed section taken substantially on the line 6—6 of Figure 4 and looking in the direction of the arrows; and Figure 7 is a schematic wiring diagram of the heater.

Referring now to the drawing, in which a stove top or other suitable support is indicated fragmentarily at 10 and shown as provided with an aperture 11 into which a burner body is adapted to fit in the manner best shown in Figure 2; it will be seen that the burner is supported by an annular bezel-like frame 12 having downturned rim 13 which rests upon the top 10, and a depressed inner rabbet 15 adapted to support the grid or grille 18. The diameter of the grid is only slightly greater than the minimum diameter of the bottom of the rabbeted portion 15, so that almost the entire rim portion 18' of the grid is also exposed to heating over the burner chamber 40. Downturned lugs 19 projecting into slots (undesignated) in the rabbet 15 maintain the grid in desired angular position, for a reason which will presently appear.

Depending from the rim frame 12 is a sleeve-like housing 20, shown as cylindrical in form and attached to the under side of the rim by angular brackets 22, which may be spot welded thereto and to the outside of sleeve 20. The sleeve 20 is preferably spaced below the bezel in such manner as to leave a gap as 23 between the housing and the stove top and other metal parts, restricting heat conduction between them, which can thus only take place through the relatively small paths afforded by the brackets 22. The small area of contact between the rim 18' of the grid and the frame 20 also limits heat conduction from the former to the latter, while the downturned rim portion 13 in turn limits conduction to the stove top. It will also be seen that the casing sleeve 20 is spaced from the stove top and centered in the aperture 11 by the brackets 22.

Fitted into the sleeve and shown as held in place by the inturned lower ends of brackets 22 are a pair of spaced insulating plates 25—26, the former and upper of which is arranged a desired distance beneath the grid 18, room being left therebetween and within the casing to form a heating chamber adapted to accommodate the heating coils 30, 31, 32 and 33, and the supports therefor. The hearth plate 25 is formed of refractory insulating material, preferably comprising a composition of vermiculite together with suitable binder, although other suitable substances having the required heat and electrical insulating and mechanical characteristics might be used. The plate 26 is preferably formed of like material. The top of the plate 25 is preferably grooved as at 35 to permit independent movement of the top surface portions of the plate thus separated, under the mechanical effects of the relatively high heat to which they are subjected. Such provision prevents the cracking of this plate which would otherwise occur because of the great temperature differential between opposite faces thereof when the burner is operating. A foot as 18² projects downward from the central part of grille 18 to provide additional support for such part by its engagement with an adjustable rest 17 carried by the hearth plate.

Between the chamber 40 in which the heating elements are housed and the sleeve 20 an inner sleeve 44 is preferably arranged in spaced relation, the chamber between these sleeves limiting the transmission of heat to the outer metal portions and consequent loss thereof. The insulating effect may be augmented if desired by means of an additional interposed sleeve as 45, shown as spaced from the others and preferably formed of a material calculated to resist propagation of radiant heat as well as relatively high temperatures. Mica is a suitable material.

As shown in the drawing, the heating elements are composed of helical coils of resistance wire or the like through each of which extends a supporting bar of refractory insulating material such as porcelain, the bars being of substantially smaller cross section than the inner diameter of the heating coils. The bars supporting the coils 30–33 inclusive are respectively designated 50, 51, 52 and 53 and are terminally loosely fitted into supporting brackets 55 carried by and upstanding from top plate 25. The brackets hold the bars at such height above the plate that the coils carried thereby clear the surface of the plate, as clearly shown in Figures 2 and 5. One bracket is so arranged at each end of each of the rods 50—53, and preferably freely slidable therein, so that under expansion and contraction the rods may slide through the supporting brackets. Complete displacement of the rod is prevented despite such freedom by the stems of terminal screws 57, which project across the ends of the rods as shown in Figure 5, although clearance is allowed. As also shown in this view and in Figure 4, the ends of the resistance coils are welded or otherwise suitably secured to lugs as 59 fitted beneath binding screws and preferably having downturned edges extending beside the overbent top portions of the brackets 55 by which they are carried, to prevent accidental turning of the lugs. The area of the lugs will also be seen to be exaggerated to assist in dissipating heat from the terminals. The base of each bracket 55 is preferably secured to the plate 25 by one or more screws as 60, which also furnish electrical connection and project completely through the plate and into lower plate 26. Connection to each of the screws 60 is made between the plates, which are spaced from each other by the nuts 62 serving to attach the connecting wires as 64.

The supporting rods 50—53 for the heating elements are preferably hollow and reinforced by a metal insert 65 of rod or wire (Figure 6). The metal inserts preferably stop short of the ends, which are plugged with refractory cement or the like as at 54.

Terminal connections for the unit as a whole are provided by binding posts 66, which project through both plates 25—26, and perform the mechanical function of holding the plates together and against the nuts 62 which serve as spacers, as well as providing connection between the outside leads 70 to the controlling switch, (unshown) and the wiring to the heating elements generally designated 64 and arranged between the plates. A sub panel 72 is shown arranged beneath the nuts 73 carried by the binding posts, such plate being adapted to assist in radiating any heat conducted from chamber 40 by the binding posts. A suitable wiring arrangement for the heating coils is shown in Figure 7, which will be seen to be such that when power is supplied to the two outer terminals 66—68 only, a series hook-up is provided in which all coils are energized with the minimum current flow to furnish the low heat setting. When the two outer terminals are connected and one power lead run to these and the other to the middle terminal 67, a series-parallel arrangement is provided with two pairs of coils in series, thereby halving the direct current resistance and increasing the current flow through all coils to the normal maximum designed rating and providing a high heat setting. When any two adjacent terminals are connected, two coils only are energized at the full rating to provide an intermediate heat setting. When terminals 66—67 are connected coils 30—32 are energized, and when terminals 67—68 are connected coils 31—33 are energized, as will be seen.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

What I claim is:

1. In combination with suitable supporting means therefor, an integral, substantially straight expansible and contractible rod-like insulating support of refractory material extending horizontally through free space and having a longitudinal channel therein, an electrical resistance element coiled thereover in loops substantially larger than the support and engaging the support at intervals only, and a metallic reinforcing member in said channel expansible and contractible independently of the support.

2. In an electric burner construction, a pair of spaced supports, a substantially straight and horizontal refractory elongated coil-supporting element extending between said first mentioned supports and movable longitudinally with relation to at least one thereof, a metallic reenforcing element extending through at least a portion of said element and expansible and contractible independently thereof, means preventing an undesired degree of displacement of the coil-supporting element with relation to said supports, and an helically coiled filamentary resistance element of substantially greater diameter than said coil-supporting element, each turn of said resistance element being coiled over and dependingly supported by said coil-supporting element.

3. A support for a coiled resistance element comprising an integral substantially straight horizontally arranged tubular refractory member, an elongated metallic reenforcing member freely expansible and contractible at least at one end arranged therewithin but expansible and contractible independently thereof and stopping short of the ends thereof, and refractory holding means preventing escape of the reenforcing from the tubular refractory member without preventing such expansion and contraction.

4. In an electric burner construction, a heating element comprising a coiled resistance wire, a straight integral refractory supporting tube member extending through said element and engaging it at spaced points only, said tube being materially smaller than the coils and adapted to support said heating element throughout substantially its entire effective length above but substantially parallel to an hearth plate or the like, and metallic reinforcing means arranged within but expansible and contractible independently of said supporting tube member.

5. In an electric burner construction, a pair of spaced supporting brackets, a rod-like supporting element of insulated material supported in said brackets adjacent its ends and slidable in at least one of said brackets to allow independent expansion and contraction thereof, means limiting longitudinal movement of the rod-like element, a filamentary resistance element loosely wound over and dependingly carried by said rod-like element, and a metallic reinforcing element in said rod-like element expansible and contractible independently thereof.

6. An electrical heating device comprising an elongated horizontally disposed substantially straight and integral refractory supporting member having an opening extending longitudinally thereof, a coiled resistance wire wound in helical form thereover and having each turn suspended therefrom, the diameter of the helix being substantially greater than that of the supporting member, and an independently expansible and contractible reinforcing member extending through the opening in the supporting member and of relatively much smaller diameter than the helix.

7. Means as set forth in claim 6 in which said reinforcing member is substantially smaller than the supporting member but substantially fills the opening therein.

8. In combination with a heating device as set forth in claim 6, holding means for said supporting member allowing longitudinal movement of at least one end thereof.

9. An electrical heating device comprising a horizontally disposed substantially straight integral tubular refractory supporting member, a coiled resistance wire wound in helical form thereover and having each turn thereof suspended therefrom, the diameter of the helix being substantially greater than that of the supporting member, an independently expansible and contractible reinforcing member within the supporting member and also lying substantially straight and parallel to the axes of the supporting member and of the helix.

10. An electrical heating device comprising a horizontally disposed substantially straight integral tubular refractory supporting member having an internal diameter substantially less than its external diameter, a coiled resistance wire wound in helical form thereover and having each turn thereof suspended therefrom, the diameter of the helix being substantially greater than that of the supporting member, an independently expansible and contractible reinforcing member within and substantially filling the supporting member and lying substantially parallel to the axis of the helix.

ARTHUR H. HAPPE.